United States Patent [19]

Strom

[11] 4,424,395
[45] Jan. 3, 1984

[54] CARBAMATES OF BIPHENYLS

[75] Inventor: Robert M. Strom, Midland, Mich.

[73] Assignee: The Dow Chemical Company, Midland, Mich.

[21] Appl. No.: 357,345

[22] Filed: Mar. 11, 1982

[51] Int. Cl.$^3$ ............... C07C 125/075; C07C 125/073
[52] U.S. Cl. .................................... 560/133; 560/160; 560/164
[58] Field of Search ....................... 560/133, 160, 164

[56] References Cited

U.S. PATENT DOCUMENTS

| | | | |
|---|---|---|---|
| 3,598,866 | 8/1971 | Nowak et al. | 560/133 |
| 3,627,819 | 12/1971 | Nowak et al. | 560/166 |
| 3,726,886 | 4/1973 | Woo et al. | 560/164 |
| 4,107,229 | 8/1978 | Tideswell et al. | 560/133 |
| 4,250,322 | 2/1981 | Efimov et al. | 560/133 |

Primary Examiner—Natalie Trousof
Assistant Examiner—Patricia M. Scott
Attorney, Agent, or Firm—Douglas N. Deline

[57] ABSTRACT

Difunctional ethylenically unsaturated carbamate derivatives of 4,4'-dihydroxybiphenyl compounds are disclosed.

6 Claims, No Drawings

CARBAMATES OF BIPHENYLS

BACKGROUND OF THE INVENTION

The present invention relates to certain derivatives of dihydroxy-substituted biphenyl compounds. In particular the present invention relates to carbamate derivatives of dihydroxy-substituted biphenyl compounds containing ethylenic unsaturation in the carbamate moiety. The difunctional compounds are useful monomers and cross-linking agents for polymeric applications.

Polyfunctional carbamates have been previously described in the art. In U.S. Pat. No. 3,598,866 vinyl isocyanate and isopropenyl isocyanate derivatives of bisphenol A, halogenated bisphenol A, hydrogenated bisphenol A and alkoxylated bisphenol A were described.

In U.S. Pat. No. 3,726,886 similar derivatives of hydroxymethylated diphenyloxide were described.

SUMMARY OF THE INVENTION

According to the present invention are provided novel difunctional ethylenically unsaturated carbamate derivatives of biphenyl compounds corresponding to the formula:

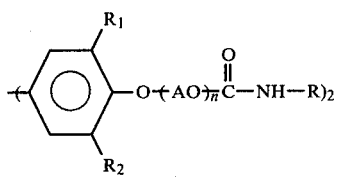

wherein:
  $R_1$ and $R_2$ are selected from the group consisting of hydrogen, $C_{1-4}$ alkyl, and phenyl;
  A each occurrence is independently a $C_{2-4}$ vicinal alkylene group;
  n is an integer from zero to about 20; and
  R is an ethylenically unsaturated aliphatic moiety selected from the group consisting of $-CR'=CH_2$ and $-CH_2CH_2OC(O)CR'=CH_2$ where R' is hydrogen or methyl.

The compounds are useful monomers which may be polymerized or copolymerized with compounds containing ethylenic unsaturation. Because the compounds are difunctional they are well suited to be employed as cross-linking agents in various polymeric systems, e.g., polystyrene, polyvinyltoluene, polyacrylates, etc. The compounds and polymeric derivatives thereof are extremely stable when exposed to adverse extremes of heat and electromagnetic radiation due to the absence of aliphatic or hetero atom bridging moieties between the phenylene moieties. In addition, the antioxidant properties, particularly of the alkyl-substituted biphenyl compounds, render the instant compounds extremely useful as latent antioxidants that may be incorporated into a polymeric structure.

DETAILED DESCRIPTION OF THE INVENTION

The instant invented compounds may be prepared by reaction of an isocyanato-containing reactant selected from the group consisting of vinyl isocyanate, isopropenyl isocyanate, isocyanatoethyl acrylate and isocyanatoethyl methacrylate with 4,4'-dihydroxybiphenyl and derivatives thereof. More specifically the 4,4'-dihydroxybiphenyl compounds are those of the formula:

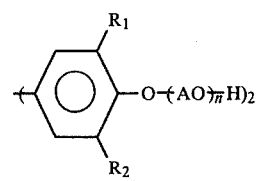

wherein R, A and n are as previously defined.

Such compounds are a well-known class and are available commercially or may be prepared according to known techniques. For example, compounds wherein n in the above formula is not zero may be prepared by contacting a $C_{1-4}$ vicinal alkylene oxide with the corresponding 3,3',5,5'-tetrasubstituted 4,4'-dihydroxybiphenyl compound.

The reaction is conveniently conducted in a suitable inert solvent, such as diethyl ether, tetrahydrofuran, toluene, etc., at ambient or elevated temperatures. Slightly elevated temperatures of up to about 150° C. are preferred in order to obtain a suitable reaction rate. A catalyst such as tin octoate may be employed if desired.

The invented compounds are recovered from the reaction mixture by standard techniques such as filtration or decanting. Preferred compounds of the invention are those corresponding to the formula provided wherein n is zero. Highly preferred are such compounds wherein in addition $R_1$ and $R_2$ are hydrogen, methyl or tertiary butyl. Most preferred compounds are those wherein R is $-CH_2CH_2OC(O)CR'=CH_2$.

SPECIFIC EMBODIMENTS

Having described the invention, the following example is provided as further illustrative and is not to be construed as limiting.

EXAMPLE 1

To a 50-ml round-bottom flask equipped with a reflux condenser, magnetic stirrer, temperature control and dry air atmosphere, was charged 3,3',5,5'-tetra-t-butyl-4,4'-dihydroxybiphenyl (5.0 g), tin octoate catalyst (3 drops), isocyanatoethyl methacrylate (3.8 g) and toluene (20 ml). The reaction mixture was heated to 80° C. for 30 minutes. After cooling, a white precipitate was collected, washed with cold toluene, and dried. Yield was 4.5 g. Analysis by nuclear magnetic resonance spectroscopy identified the product as 3,3',5,5'-tetrakis(1,1-dimethylethyl)-1,1'-biphenyl-4,4'-diyl bis(oxycarbonylamino-2,1-ethanediyl)bis(2-methyl-2-propenoate), e.g., a compound of the formula:

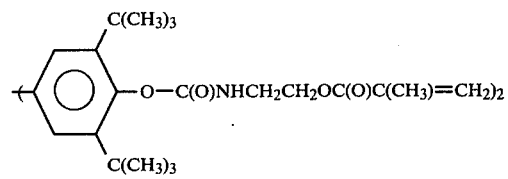

What is claimed is:
1. A compound corresponding to the formula:

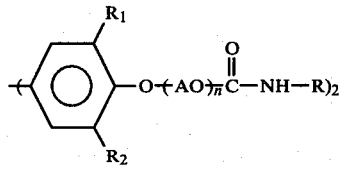

wherein:
  $R_1$ and $R_2$ are selected from the group consisting of hydrogen, $C_{1-4}$ alkyl, and phenyl;
  A each occurrence is independently a $C_{2-4}$ vicinal alkylene group;
  n is an integer from zero to about 20; and
  R is an ethylenically unsaturated aliphatic moiety selected from the group consisting of $-CR'=CH_2$ and $-CH_2CH_2OC(O)CR'=CH_2$ where $R'$ is hydrogen or methyl.

2. A compound according to claim 1 wherein n is zero.

3. A compound according to claim 2 wherein $R_1$ and $R_2$ are hydrogen, methyl or tertiary butyl.

4. A compound according to claim 3 wherein R is $-CH_2CH_2OC(O)CR'=CH_2$.

5. A compound according to claim 4 which is 3,3',5,5'-tetrakis(1,1-dimethylethyl)-1,1'-biphenyl-4,4'-diyl bis(oxycarbonylamino-2,1-ethanediyl)bis(2-methyl-2-propenoate).

6. A compound according to claim 3 wherein R is $-CR'=CH_2$.

* * * * *